United States Patent
Ramola et al.

(10) Patent No.: US 12,299,959 B2
(45) Date of Patent: May 13, 2025

(54) METHOD AND ELECTRONIC DEVICE FOR DETECTING CANDID MOMENT IN IMAGE FRAME

(71) Applicant: SAMSUNG ELECTRONICS CO., LTD., Suwon-si (KR)

(72) Inventors: Gaurav Ramola, Karnataka (IN); Nikhar Maheshwari, Karnataka (IN); Aniket Devdatta Rege, Karnataka (IN); Sudha Velusamy, Karnataka (IN); Girish Kulkarni, Karnataka (IN); Sai Pranav Mathivanan, Karnataka (IN); Swadha Jaiswal, Karnataka (IN); Pradeep Kumar Vegireddi, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/743,990

(22) Filed: May 13, 2022

(65) Prior Publication Data

US 2022/0277547 A1    Sep. 1, 2022

Related U.S. Application Data

(63) Continuation of application No. PCT/KR2021/019994, filed on Dec. 28, 2021.

(30) Foreign Application Priority Data

Jan. 6, 2021  (IN) ............................. 202141000608
Sep. 21, 2021 (IN) ............................. 202141000608

(51) Int. Cl.
*G06V 10/771*    (2022.01)
*G06V 10/75*     (2022.01)
(Continued)

(52) U.S. Cl.
CPC ............ *G06V 10/771* (2022.01); *G06V 10/75* (2022.01); *G06V 10/7715* (2022.01); *G06V 40/10* (2022.01); *G06V 2201/07* (2022.01)

(58) Field of Classification Search
CPC .. G06V 10/771; G06V 10/75; G06V 10/7715; G06V 40/10; G06V 2201/07; G06V 40/20; G06V 40/16; G06N 3/08
(Continued)

(56) References Cited

U.S. PATENT DOCUMENTS 6,763,148 B1 * 7/2004 Sternberg ............... G06V 20/00
                                                      707/E17.02
6,940,545 B1 * 9/2005 Ray ....................... H04N 23/611
                                                         348/222.1
(Continued)

FOREIGN PATENT DOCUMENTS

| | | |
|---|---|---|
| CN | 105915801 | 8/2016 |
| KR | 10-1986002 | 6/2019 |

(Continued)

OTHER PUBLICATIONS

International Search Report for PCT/KR2021/019994 mailed Apr. 22, 2022, 4 pages.
(Continued)

*Primary Examiner* — Negussie Worku
(74) *Attorney, Agent, or Firm* — Nixon & Vanderhye P.C.

(57) ABSTRACT

Embodiments herein provide a method for detecting a candid moment in an image frame. The method includes: receiving, by an electronic device, image frames; determining, by the electronic device, a candid score of each image frame in the image frames using a Machine Learning (ML) model, wherein the candid score is a quantitative value of candidness present in the image frames; determining, by the electronic device, whether the candid score of the image
(Continued)

frame in the image frames meets a threshold candid score; identifying, by the electronic device, that the candid moment is present in the image frame in response to determining that the candid score of the image frame meets the threshold candid score; and displaying, by the electronic device, the image frame comprising the candid moment.

11 Claims, 13 Drawing Sheets

(51) Int. Cl.
  *G06V 10/77* (2022.01)
  *G06V 40/10* (2022.01)
(58) Field of Classification Search
  USPC .......................................................... 382/103
  See application file for complete search history.

(56) References Cited

U.S. PATENT DOCUMENTS

| | | | | |
|---|---|---|---|---|
| 10,262,220 | B1* | 4/2019 | Pribble | G06V 10/242 |
| 10,755,087 | B2* | 8/2020 | Rajvanshi | G06V 40/176 |
| 11,297,248 | B2* | 4/2022 | Pribble | G06T 7/0002 |
| 2018/0349682 | A1* | 12/2018 | Wong | G06V 40/172 |
| 2020/0134296 | A1* | 4/2020 | Rajvanshi | G06V 10/82 |
| 2020/0244859 | A1* | 7/2020 | Pribble | H04N 23/667 |
| 2020/0267313 | A1 | 8/2020 | Youn et al. | |
| 2020/0380690 | A1* | 12/2020 | Cheng | G06T 7/143 |
| 2021/0133861 | A1* | 5/2021 | Kumar | G06F 18/214 |
| 2022/0038621 | A1* | 2/2022 | Lee | H04N 23/80 |
| 2022/0230331 | A1* | 7/2022 | Ramola | H04N 21/440245 |
| 2022/0269899 | A1* | 8/2022 | Goldstein | G06N 3/045 |
| 2023/0066331 | A1* | 3/2023 | Kumar | G06V 40/174 |

FOREIGN PATENT DOCUMENTS

| | | |
|---|---|---|
| KR | 10-2020-0044644 | 4/2020 |
| KR | 10-2020-0060166 | 5/2020 |
| KR | 10-2020-0132569 | 11/2020 |

OTHER PUBLICATIONS

Written Opinion of the ISA for PCT/KR2021/019994 mailed April 22, 2022, 4 pages.
J. Fiss et al., "Candld portrait selection trom video", ACM Trans. Graph, 128, 2011, 8 pages.
G. Wang et al., "Seeing People in Social Context: Recognizing People and Social Relationships", In: Daniilidis, K., Maragos, P., Paragios, N. (eds.) ECCV 2010, Part V. LNCS, vol. 6315, 2010, 36 pages.
A. Dhall et al., "Finding Happiest Moments in a Social Context", In Proceedings of the Asian Conference on Computer Vision (ACCV), 2012, 14 pages.
S. Chu et al., "Interacting with a self-portrait camera using motion-based hand gestures", Proceedings of the 11th Asia Pacific Conference on Computer Human Interaction, Sep. 24-27, 2013, 9 pages.
H. Lang, et al., "Covert photo Classification by fusing image features and visual attributes", IEEE Trans. Image Process., vol. 24, No. 10, Oct. 2015, pp. 2996-3008.
Office Action for IN Application No. 202141000608 dated Jul. 12, 2022, 6 pages.

* cited by examiner

NON-CANDID IMAGE FRAME 151   CANDID IMAGE FRAME 152

METHOD AND ELECTRONIC DEVICE FOR DETECTING CANDID MOMENT IN IMAGE FRAME

CROSS-REFERENCE TO RELATED APPLICATIONS

This application is a continuation of International Application No. PCT/KR2021/019994 designating the United States, filed on Dec. 28, 2021, in the Korean Intellectual Property Receiving Office and claiming priority to Indian Provisional Patent Application No. 202141000608, filed on Jan. 6, 2021, in the Indian Patent Office and Indian Patent Application No. 202141000608, filed on Sep. 21, 2021, in the Indian Patent Office, the disclosures of all of which are incorporated by reference herein in their entireties.

BACKGROUND

Field

The disclosure relates to image handling techniques, and for example, to a method and an electronic device for detecting a candid moment in an image frame.

Description of Related Art

A candid photograph may refer to a photograph captured without creating a posed appearance which leads to a better impression than a photograph with posed appearance. Capturing the candid photograph of an object requires a photographer constantly observing and notice the object which is a harder work than setting up a posed photoshoot. Moreover, the photographer is often able to capture the candid photograph through an intuition developed through their professional experience, which is often a difficult task for a common user. The user captures a burst shot of the object while the object engages in an activity and manually chooses the candid photograph from a set of images generated from the burst short, which is still a burden to the user. Therefore, it is desired to address the aforementioned problems to assist the user in automatically capturing or selecting the candid photograph of the object.

SUMMARY

Embodiments of the disclosure provide a method and an electronic device for detecting a candid moment in an image frame. The electronic device analyses various parameters in captured photos of a user and automatically chooses images of the user with the candid moment from the captured photos. Further, the user can use those images for putting as a profile picture, making a modeling portfolio, a collage, a video clip, etc. Therefore, the proposed method reduces a burden on the user in finding candid pictures from a set of pictures, which saves a lot of time for the user in image editing process and significantly improves a user experience in image editing.

Embodiments of the disclosure provide a method and electronic device to guide the user to capture an image/video with the candid moment. While previewing the image frame, the electronic device provides a real-time indication to the user about a level of candidness of the previewed image frame. Moreover, the electronic device provides tips to the user to improve the level of candidness of the previewed image frame. Further, the user can necessary actions as per the tips for improving the level of candidness of the previewed image frame, and capture the image/video. Thus, the method helps the user to capture candid pictures/videos, which significantly improves a user experience in photography/videography.

Accordingly, example embodiments herein provide a method for detecting a candid moment in an image frame. The method includes receiving, by an electronic device, a plurality of image frames. The method includes determining, by the electronic device, a candid score of each image frame in the plurality of image frames using a Machine Learning (ML) model, wherein the candid score is a quantitative value of candidness present in the plurality of image frames. The method includes determining, by the electronic device, whether the candid score of the image frame in the plurality of image frames meets a threshold candid score. The method includes identifying, by the electronic device, that the candid moment is present in the image frame in response to determining that the candid score of the image frame meets the threshold candid score. The method includes displaying, by the electronic device, the image frame including the candid moment.

In an example embodiment, determining, by the electronic device, the candid score of each image frame in the plurality of image frames using the ML model, includes: identifying, by the electronic device, local features including a head pose, a gaze, a body pose and an expression, in the plurality of image frames, determining, by the electronic device, a first score of the local features using the ML model, wherein the first score is a quantitative value of the local features present in the plurality of image frames, identifying, by the electronic device, global features including a gesture, a body pose, a relationship between objects, a activity, an interaction between the objects, in the plurality of image frames, determining, by the electronic device, a second score of the global features using the ML model, wherein the second score is a quantitative value of the global features present in the plurality of image frames, and determining, by the electronic device, the candid score of each image frame in the plurality of image frames by providing the first score and the second score to the ML model.

In an example embodiment, displaying, by the electronic device, the image frame including the candid moment, includes displaying, by the electronic device, the image frame including the candid moment with the candid score.

In an example embodiment, the method includes detecting, by the electronic device, that the candid score does not meet an upper limit of the candid score. Further, the method includes identifying, by the electronic device, local features and/or global features that need to change for increasing the candid score based on scores of the local features and the global features. Further, the method includes displaying, by the electronic device, a recommendation for changing the identified local features and/or the identified global features for increasing the candid score.

In an example embodiment, wherein the ML model is trained for determining the candid score by: receiving, by the ML model, a classification on candid images and non-candid images, determining, by the ML model, local features and global features in the candid images and non-candid images, receiving, by the ML model, scores of the local features and the global features in each candid images, and correlating, by the ML model, the scores of the local features and the global features with the local features and the global features in the candid images respectively.

Accordingly, various example embodiments herein provide a method for automatically detecting a best moment in preview image frames. The method includes receiving, by the electronic device, the preview image frames from a camera sensor. The method includes estimating, by the electronic device, a first score for each preview image frame using the local features. The method includes estimating, by the electronic device, a second score for each preview image frame using the global features. The method includes determining, by the electronic device, the candid score for each preview image frame using the first score and the second score. The method includes recommending, by the electronic device, at least one preview image frame with the candid score above the threshold candid score.

According to various example embodiments, an electronic device is provided, the electronic device configured to detect a candid moment in the image frame. The electronic device includes: a candid engine, a memory, a processor, wherein the candid engine is coupled to the memory and the processor. The candid engine is configured to receive the plurality of image frames. The candid engine is configured to determine a candid score of each image frame in the plurality of image frames using the ML model, wherein the candid score is the quantitative value of candidness present in the plurality of image frames. The candid engine is configured to determine whether the candid score of the image frame in the plurality of image frames meets the threshold candid score. The candid engine is configured to identify that the candid moment is present in the image frame in response to determining that the candid score of the image frame meets the threshold candid score. The candid engine is configured to display the image frame including the candid moment.

These and other aspects of the various example embodiments herein will be better appreciated and understood when considered in conjunction with the following description and the accompanying drawings. It should be understood, however, that the following descriptions, while indicating various example embodiments and numerous details thereof, are given by way of illustration and not of limitation. Many changes and modifications may be made within the scope of the disclosure, and the embodiments herein include all such modifications.

BRIEF DESCRIPTION OF THE DRAWINGS

Various example embodiments of the disclosure are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
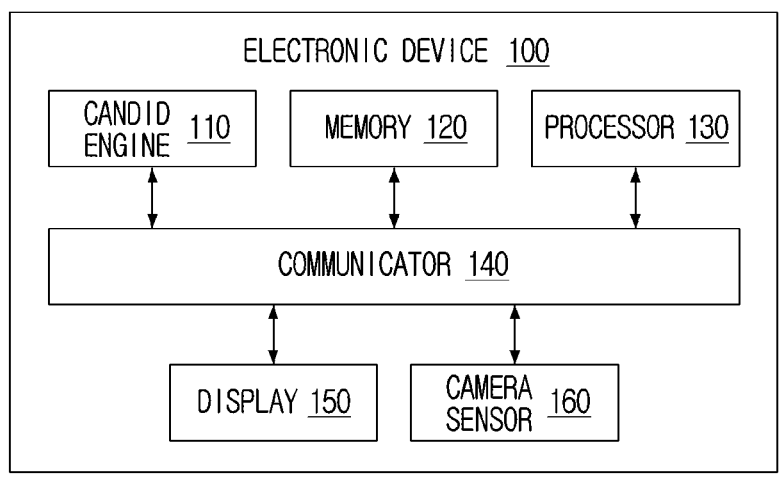
FIG. 1 is a block diagram illustrating an example configuration of an electronic device configured to detect a candid moment in an image frame, according to various embodiments.

The various example embodiments herein and the various features and advantageous details thereof are explained more fully with reference to the non-limiting example embodiments that are illustrated in the accompanying drawings and described in the following disclosure. Descriptions of well-known components and processing techniques may be omitted so as to not unnecessarily obscure the embodiments herein. The various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally used to distinguish one element from another.

Various example embodiments of the disclosure provide a method for detecting a candid moment in an image frame. The method may, for example, include: receiving, by an electronic device, a plurality of image frames; determining, by the electronic device, a candid score of each image frame in the plurality of image frames using a Machine Learning (ML) model, wherein the candid score is a quantitative value of candidness present in the plurality of image frames; determining, by the electronic device, whether the candid score of the image frame in the plurality of image frames meets a threshold candid score; identifying, by the electronic device, that a candid moment is present in the image frame in response to determining that the candid score of the image frame meets the threshold candid score; and displaying, by the electronic device, the image frame including the candid moment.

Various example embodiments of the disclosure provide a method for automatically detecting a best moment in preview image frames. The method includes: receiving, by the electronic device, a preview image frames from a camera sensor; estimating, by the electronic device, a first score for each preview image frame using the local features; estimating, by the electronic device, a second score for each preview image frame using the global features; determining, by the electronic device, a candid score for each preview image frame using the first score and the second score; and recommending, by the electronic device, at least one preview image frame with the candid score above a threshold candid score.

Various example embodiments of the disclosure provide an electronic device configured to detect a candid moment in an image frame. The electronic device includes: a candid engine, a memory, a processor, wherein the candid engine is coupled to the memory and the processor. The candid engine is configured to receive the plurality of image frames. The candid engine is configured to determine a candid score of each image frame in the plurality of image frames using the ML model, wherein the candid score is a quantitative value of candidness present in the plurality of image frames. The candid engine is configured to determine whether the candid score of the image frame in the plurality of image frames meets a threshold candid score. The candid engine is configured to identify that the candid moment is present in the image frame in response to determining that the candid score of the image frame meets the threshold candid score. The candid engine is configured to display the image frame including the candid moment.

The method allows the electronic device to quantify the candidness in the image frame, and identifies factors in the image frame contributing most to the candidness, and fetches a most candid moment of a scene to the user along with feedback about the factor that makes the scene candid.

The method helps the user to simply point the electronic device (e.g. camera) at the scene and automatically acquire only candid moments. Additionally, the electronic device provides the user with a list of features which make the scene candid and helps the user to learn how to capture the scene with better candid moments.

In an example embodiment, the method includes: appending metadata information obtained from recommended preview image frames and including useful scene understanding analysis in the output. The method helps the user to identify the most relevant features which were used to assign high candidness score by displaying them to the user. The method helps the user to learn over time the way to take the candid images and the features that are highly correlated will result in high candidness score. For example a correlation of emotion and motion such as jumping with shock will give a high score, and the user will learn over time to look for such moments. Using a gesture-based trigger instead of dedicated candid mode can extend the proposed method to, for example, Augmented Reality (AR) mode in a Virtual Reality (VR) device.

Unlike existing methods and systems, the electronic device analyses various parameters in captured photos of a user and automatically chooses images of the user with the candid moment from the captured photos. Further, the user can use those images for a profile picture, making a modelling portfolio, a collage, a video clip, etc. Therefore, the proposed method eliminates a burden on the user in finding candid pictures from a set of pictures, which saves a lot of time for the user in the image editing process and significantly improves a user experience in the image editing.

Unlike existing methods and systems, the electronic device guides the user to capture an image/video with the candid moment. While previewing the image frame, the electronic device provides a real-time indication to the user about a level of the candidness of the previewed image frame. Moreover, the electronic device provides tips to the user to improve the level of the candidness of the previewed image frame. Further, the user can take necessary actions as per the tips for improving the level of the candidness of the previewed image frame, and capture the image/video. Thus, the method helps the user to capture candid pictures/videos, which significantly improves a user experience in photography/videography.

Referring now to the drawings, and more particularly to FIGS. 1 through 11, there are shown various example embodiments.

FIG. 1 is a block diagram illustrating an example configuration of an electronic device (100) for detecting a candid moment in an image frame, according to various embodiments. Examples of the electronic device (100) include, but not limited to a smart phone, a tablet computer, a personal digital assistance (PDA), a desktop computer, an Internet of Things (IoT), a wearable device, a camera device, etc. In an embodiment, the electronic device (100) includes a candid engine (e.g., including various processing circuitry and/or executable program instructions) (110), a memory (120), a processor (e.g., including processing circuitry) (130), a communicator (e.g., including communication circuitry) (140), a display (150), and a camera sensor (160). The candid engine (110) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The candid engine (110) receives a plurality of image frames. In an embodiment, an image frame in the plurality of image frames is a captured/stored image, or a preview image frame obtained from the camera sensor (160). Examples of the camera sensor (160) include, but not limited to a Charge-Coupled Device (CCD) sensor, a Complementary Metal Oxide Semiconductor (CMOS) sensor, or the like. In an embodiment, the plurality of image frames may be obtained from a recorded/live video. The candid engine (110) determines a candid score (e.g. 0, 1, 2, 3, 4) of each image frame in the plurality of image frames using a Machine Learning (ML) model (116). The candid score is a quantitative value of candidness present in the plurality of image frames. In an embodiment, the ML model (116) is trained for determining the candid score. In an embodiment, the candid engine (110) identifies local features including a head pose, a gaze, a body pose, and an expression, in the plurality of image frames.

The candid engine (110) determines a first score of the local features using the ML model (116) (refer to FIG. 2), where the first score is a quantitative value of the local features present in the plurality of image frames. The candid engine (110) identifies global features including, for example, a gesture, a body pose, a relationship between objects, an activity, an interaction between the objects, in the plurality of image frames, etc. The candid engine (110) determines a second score of the global features using the ML model (116), where the second score is a quantitative value of the global features present in the plurality of image frames. Further, the candid engine (110) determines the candid score of each image frame in the plurality of image frames by providing the first score and the second score to the ML model (116).

The candid engine (110) determines whether the candid score of the image frame in the plurality of image frames meets a threshold candid score (e.g. 0). The candid engine (110) identifies that the candid moment is present in the image frame, in response to determining that the candid score of the image frame meets the threshold candid score. In an embodiment, the candid score of the image frame meets the threshold candid score when the candid score of the image frame is greater than the threshold candid score. The candid engine (110) recommends the image frame includes the candid moment to the user by displaying the image frame includes the candid moment. In an embodiment, the candid engine (110) displays the image frame includes the candid moment with the candid score on the display (150). In an embodiment, the candid engine (110) displays the image frame includes the candid moment with a graphical indication or Indica such as a symbol, a smiley, an emoji, a sticker, etc.

In an embodiment, the candid engine (110) detects that the candid score does not meet an upper limit of the candid score. In an example, the upper limit of the candid score is 4. Further, the candid engine (110) identifies the local features and/or the global features that need to change for increasing the candid score based on scores of the local features and the global features. Further, the candid engine (110) displays a recommendation for changing the identified local features and/or the identified global features for increasing the candid score. In an embodiment, the recommendation is a feedback/tip to the user for improving the candid score of the image frame.

The electronic device (100) aggregates the local and global features into a set and is termed as a candid feature pool. Attributes in the candid feature pool are the ones that metrically differ the most between a traditionally captured photo and a candid capture. The local features are very limited to a human face and do not take into account human-human/object interactions and foreground-background understanding. But, the global features also play a major role in determining the candidness of the shot. Unlike the existing systems, the electronic device (100) uses the global features along with the local features for determining the candidness of the scene. The proposed method allows the electronic device (100) to train the ML model (116) to simultaneously learn the local as well as the global/spatial context features to perform the candid moment detection better.

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) may include various processing circuitry and is configured to execute instructions stored in the memory (120). The processor (130) may include a general-purpose processor, such as, for example, a Central Processing Unit (CPU), a dedicated processor, an Application Processor (AP), or the like, a graphics-only processing unit such as a Graphics Processing Unit (GPU), a Visual Processing Unit (VPU) and the like. The processor (130) may include multiple cores to execute the instructions. The communicator (140) may include various communication circuitry and is configured for communicating internally between hardware components in the electronic device (100). Further, the communicator (140) is configured to facilitate the communication between the electronic device (100) and other devices via one or more networks (e.g. Radio technology). The communicator (140) may include an electronic circuit specific to a standard that enables wired or wireless communication.

Although the FIG. 1 shows the hardware components of the electronic device (100) it is to be understood that various embodiments are not limited thereto. In various embodiments, the electronic device (100) may include less or more number of components. Further, the labels or names of the components are used only for illustrative purpose and does not limit the scope of the disclosure. One or more components can be combined together to perform same or substantially similar function for detecting the candid moment in the image frame.

Figure 2:
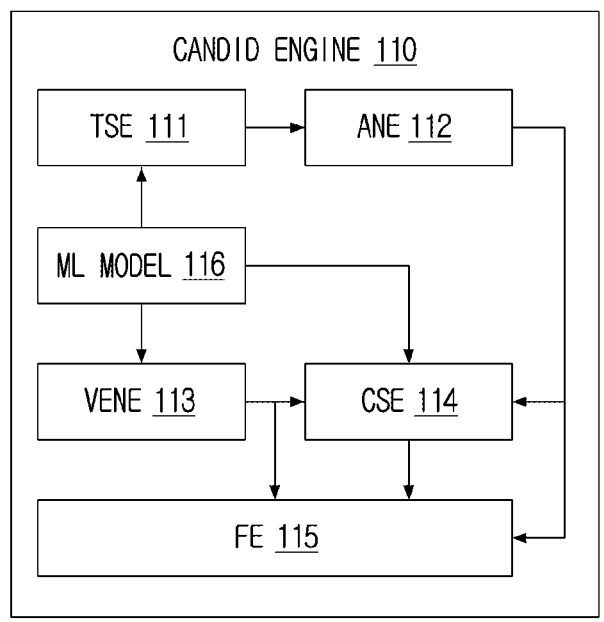
FIG. 2 is a block diagram illustrating an example configuration of a candid engine for displaying the image frame with the candid moment, according to various embodiments.

FIG. 2 is a block diagram illustrating an example configuration of the candid engine (110) for displaying the image frame with the candid moment, according to various embodiments. In an embodiment, the candid engine (110) may include a Task-Specific Engine (e.g., including various processing circuitry and/or executable program instructions) (TSE) (111), an Attribute Network Engine (e.g., including various processing circuitry and/or executable program instructions) (ANE) (112), the ML model (e.g., including various processing circuitry and/or executable program instructions) (116), a Visual Embedder Network Engine (e.g., including various processing circuitry and/or executable program instructions) (VENE) (113), a Candidness Scoring Engine (e.g., including various processing circuitry and/or executable program instructions) (CSE) (114), and a Feedbacking Engine (e.g., including various processing circuitry and/or executable program instructions) (FE) (115). The TSE (111), the ANE (112), the ML model (116), the VENE (113), the CSE (114), and the FE (115) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The TSE (111) and the VENE (113) may receive the plurality of image frames. The TSE (111) may identify the local features including the head pose, the gaze, the body pose, and the expression, in the plurality of image frames. The ANE (112) may determine the first score of the local features using the ML model (116). The VENE (113) may identify the global features including the gesture, the body pose, the relationship between objects, the activity, the interaction between the objects, in the plurality of image frames. Further, the VENE (113) may determine the second score of the global features using the ML model (116).

The CSE (114) may determine the candid score of each image frame in the plurality of image frames by providing the first score and the second score to the ML model (116). Further, the CSE (114) may determine whether the candid score of the image frame in the plurality of image frames meets the threshold candid score (e.g. 1). Further, the CSE (114) may identify that the candid moment is present in the image frame, in response to determining that the candid score of the image frame meets the threshold candid score. Further, the CSE (114) may display the image frame including the candid moment on the display (150).

The FE (115) may detect that the candid score does not meet the upper limit of the candid score. Further, the FE (115) may identify the local features and/or the global features that need to change for increasing the candid score based on the scores of the local features and the global features. Further, the FE (115) may display the recommendation for changing the identified local features and/or the identified global features for increasing the candid score.

In order to train the ML model (116), the ML model (116) may receive a classification of candid images and non-candid images from an external source (e.g. a user, a developer, a trainer device). Further, the ML model (116) may determine the local features and the global features in the candid images and non-candid images. Further, the ML model (116) may receive scores of the local features and the global features in each candid image from the external source. Further, the ML model (116) may correlate the scores of the local features and the global features with the local features and the global features in the candid images respectively.

At least one of the plurality of modules may be implemented through the ML model (116). A function associated with the ML model (116) may be performed through the non-volatile memory, the volatile memory, and the processor (130).

The one or a plurality of processors may control the processing of the input data in accordance with a predefined operating rule or ML model (116) stored in the non-volatile memory and the volatile memory. The predefined operating rule or artificial intelligence model is provided through training or learning.

Being provided through learning may refer, for example, to, by applying a learning technique to a plurality of learning data, a predefined operating rule or ML model (116) of a desired characteristic being made. The learning may be performed in a device itself in which the ML model (116) according to an embodiment is performed, and/or may be implemented through a separate server/system.

The ML model (116) may include a plurality of neural network layers. Each layer has a plurality of weight values, and may perform a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks, or the like.

The learning technique may include a method for training a predetermined target device (for example, a robot) using a plurality of learning data to cause, allow, or control the target device to decide or prediction. Examples of learning techniques include, but are not limited to, supervised learning, unsupervised learning, semi-supervised learning, or reinforcement learning, or the like.

Although the FIG. 2 illustrates various hardware components of the candid engine (110) it is to be understood that various embodiments are not limited thereto. In various embodiments, the candid engine (110) may include less or more number of components. Further, the labels or names of the components are used for illustrative purpose and do not limit the scope of the disclosure. One or more components can be combined together to perform same or substantially similar function for displaying the image frame with the candid moment.

Figure 3:
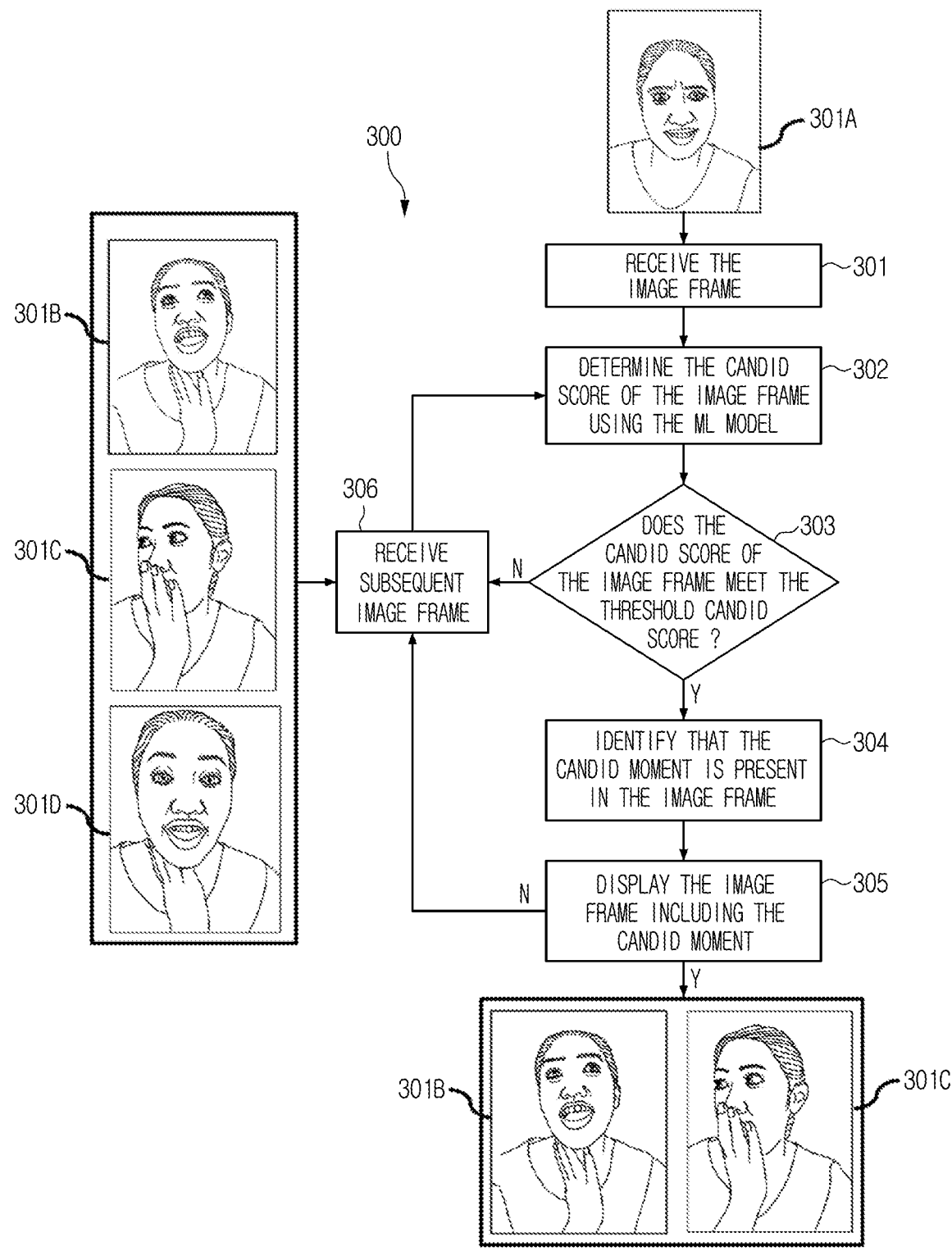
FIG. 3 is a flowchart illustrating an example method for displaying the image frame with the candid moment using the electronic device, according to various embodiments.

FIG. 3 is a flowchart 300 illustrating an example method for displaying the image frame with the candid moment using the electronic device (100), according to various embodiments. At operation 301, the method includes receiving the image frame. In an example scenario, (301A) may be the image frame. At operation 302, the method includes determining the candid score of the image frame using the ML model (116). At operation 303, the method includes determining whether the candid score of the image frame meets the threshold candid score. At operation 304, the method includes identifying that the candid moment is present in the image frame, in response to determining that the candid score of the image frame meets the threshold candid score (303—Yes). At operation 305, the method includes displaying the image frame including the candid moment. At operation 306, the method includes receiving a subsequent image frame, in response to determining that the candid score of the image frame does not meet the threshold candid score (3030—No). Further, the steps 302-305 are performed on each subsequent image frame. In the example scenario, (301B, 301C and 301D) may be subsequent image frames after the image frame (301A). In the example scenario, (301B, 301C) are detected as the image frames with the candid moment using the electronic device (100). In an embodiment, the method allows the candid engine (110) to perform the operations 301-306 of the flowchart 300.

The various actions, acts, blocks, steps, or the like in the flowchart 300 may be performed in the order presented, in a different order or simultaneously. Further, in various embodiments, some of the actions, acts, blocks, steps, or the like may be omitted, added, modified, skipped, or the like without departing from the scope of the disclosure.

Figure 4A:
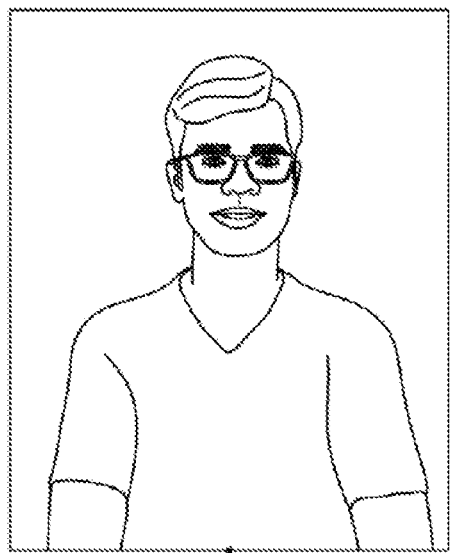
FIGS. 4A, 4B and 4C are diagrams illustrating an example method of training an ML model for determining a candid score of the image frame using the electronic device, according to various embodiments.
Figure 4A:
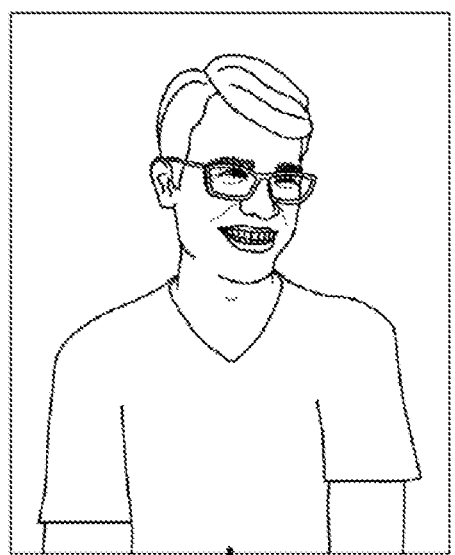
Figure 4B:
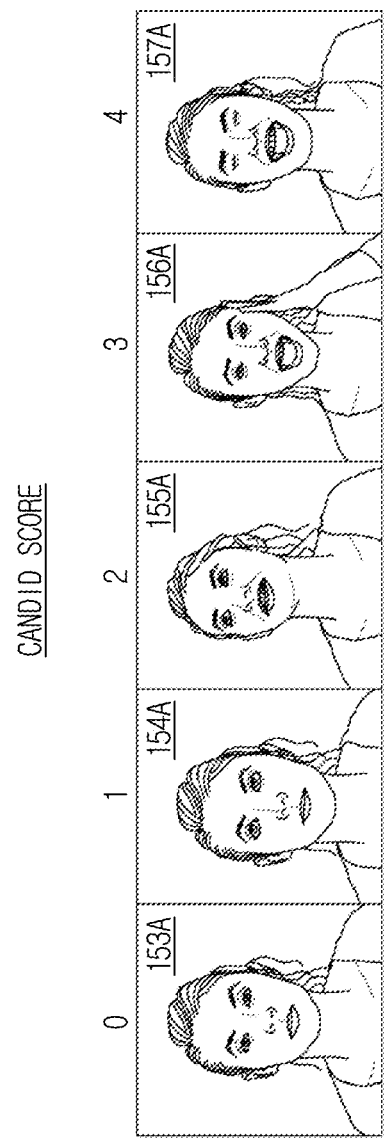
Figure 4C:
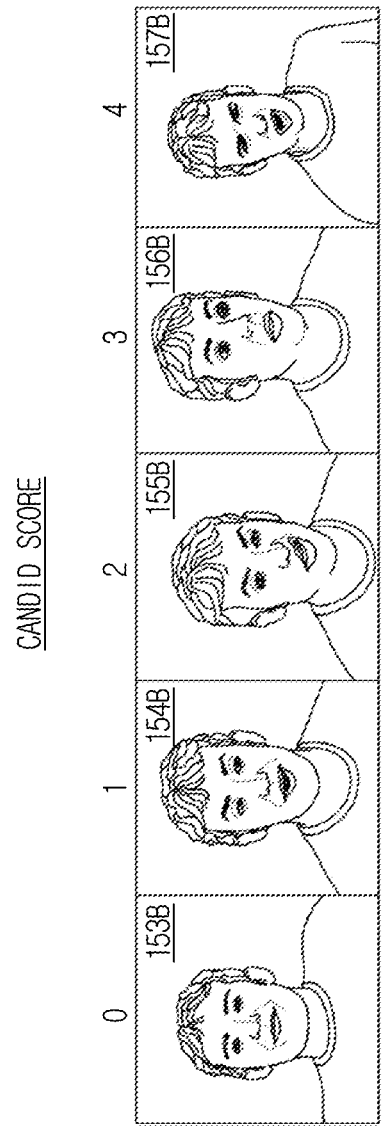

FIGS. 4A, 4B and 4C are diagrams illustrating an example method of training the ML model (116) for determining the candid score of the image frame using the electronic device (100), according to various embodiments. The method includes manually creating a set of images (e.g. 30000 images) collected randomly from various image sources and classifying each image in the set of images as the candid image or the non-candid image. With respect to FIG. 4A, (151) is an image classified as the non-candid image, whereas (152) is an image classified as the candid image in an example. Further, the method includes providing the classified images to the ML model (116) and training the ML model (116) to classify one image as the candid image or the non-candid image. Further, the method includes training the ML model (116) to analyze the local features and the global features in a set of classified images (e.g. 2000 classified images). Further, the method includes manually scoring the first score, the second score and/or the candid score of the classified images and providing the scores (e.g., the first score, the second score and/or the candid score) to the ML model (116). Further, the method includes training the ML model (116) to correlate the first score and the second score to the local features and the global features of the classified images respectively.

The ML model (116) is trained to determine the first score and the second score on an input image, and further, the electronic device (100) can determine the candid score of the input image using the first score and the second score. With respect to FIG. 4B and FIG. 4C, 0 is the threshold candid score and 4 is the upper limit of the candid score set at the electronic device (100) in an example, where the ML model (116) is trained to score the candid score of the images (153A, 153B) as 0 based on the first score and the second score of the images (153A, 153B). Further, the ML model (116) is trained to score the candid score of the images (154A, 154B) as 1 based on the first score and the second score of the images (154A, 154B). Further, the ML model (116) is trained to score the candid score of the images (155A, 155B) as 2 based on the first score and the second score of the images (155A, 155B). Further, the ML model (116) is trained to score the candid score of the images (156A, 156B) as 3 based on the first score and the second score of the images (156A, 156B). Further, the ML model (116) is trained to score the candid score of the images (157A, 157B) as 4 based on the first score and the second score of the images (157A, 157B).

Figure 5:
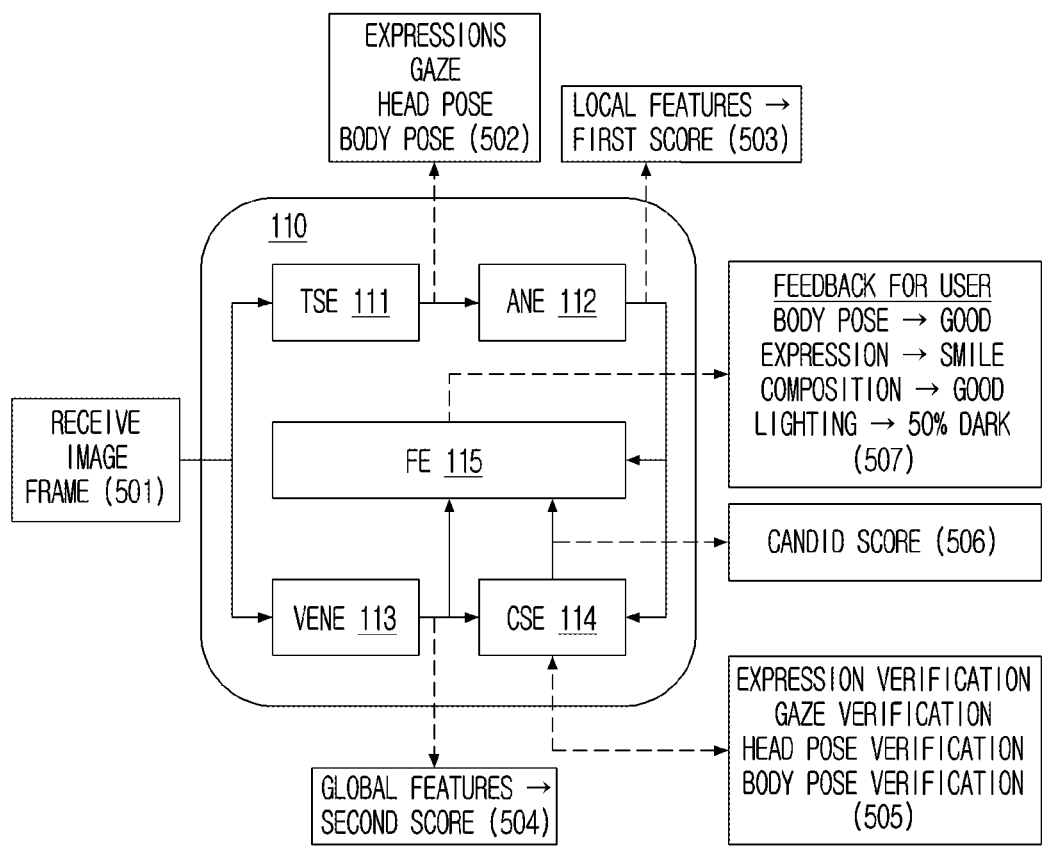
FIG. 5 is a flow diagram illustrating an example method for providing feedback to a user for improving the candid score of the image frame using the electronic device, according to various embodiments.

FIG. 5 is a flow diagram illustrating an example method for providing feedback to the user for improving the candid score of the image frame using the electronic device (100), according to various embodiments. At 501, the TSE (111) and the VENE (113) receive the image frame. At 502, the TSE (111) identifies the local features (e.g., quantifiable/categorical features) including, for example, the head pose, the gaze, the body pose, and the expression, in the image frame. The TSE (111) extracts attribute values for a candid feature pool from the image frame, which makes the ML model (116) computationally light model, increasing portability to real-time applications. The TSE (111) are already well-optimized for their relevant tasks. At 503, the ANE (112) determines the first score of the local features using the ML model (116).

At 504, the VENE (113) identifies the global features (e.g., abstract/non-categorical features) including the gesture, the body pose, the relationship between objects, the activity, the interaction between the objects, in the image frame. The VENE (113) focuses on learning a lower-level scene understanding using the global features from the candid feature pool. In an example, the VENE (113) uses a deep neural network to capture global features (e.g., spatial-temporal information) in the image frame. Further, the VENE (113) determines the second score of the global features using the ML model (116).

At 505, the CSE (114) verifies the local features in the image frame from the first score using the ML model (116). In an embodiment, the CSE (114) may include verification blocks to verify the local features in the image frame from the first score. The local features are verified by freezing weights of the ML model (116) of the ANE (112), the VENE (113), and the CSE (114). The verifications blocks are trained using the outputs from different layers in the ML model (116) of the CSE (114) for the tasks of, for example, head pose detection, a gaze estimation, a body pose detection and an expression detection.

At 506, in response to successfully validating the local features, the CSE (114) determines the candid score of the image frame by providing the first score and the second score to the ML model (116). The ANE (112) focuses on the higher-level semantics using the local features from the candid feature pool, which helps the CSE (114) to determine the intensity of the candidness. Further, the CSE (114) determines whether the candid score of the image frame meets the threshold candid score (e.g. 1). Further, the CSE (114) identifies that the candid moment is present in the image frame, in response to determining that the candid score of the image frame meets the threshold candid score.

Further, the CSE (114) displays the image frame includes the candid moment on the display (150). In response to detecting that the candid score does not meet the upper limit of the candid score, the FE (115) identifies the local features and/or the global features that need to change for increasing the candid score based on the candid score and a concatenated feature map generated using the first score and the second score. At 507, the FE (115) provides the feedback to the user for changing the identified local features and/or the identified global features for increasing the candid score. an example for the feedback includes that body pose is good, make the expression to smile, a composition is good, change lighting to 50% dark, etc.

Figure 6:
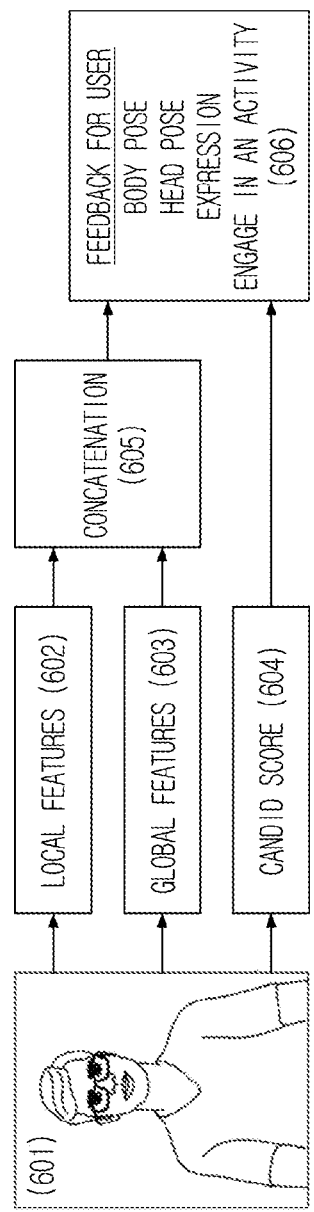
FIG. 6 is a flow diagram illustrating an example method for generating the feedback for the user to improve the candid score of the image frame using the electronic device, according to various embodiments.

FIG. 6 is a flow diagram illustrating an example method for generating the feedback (606) for the user to improve the candid score of an image frame (601) using the electronic device (100), according to various embodiments. The electronic device (100) determines the local features (602), the global features (603), and the candid score (604) of the image frame (601), in response to receiving the image frame (601). Further, the FE (115) of the electronic device (100) may concatenate (605) the local features (602) and the global features (603) and generates a concatenated feature map. Further, the FE (115) generates the feedback (606) for the user to improve the candid score of an image frame (601) based on the concatenated feature map and the candid score (604) of the image frame (601), where the feedback is used by the user to naturally learn for capturing better candid moments.

Figure 7:
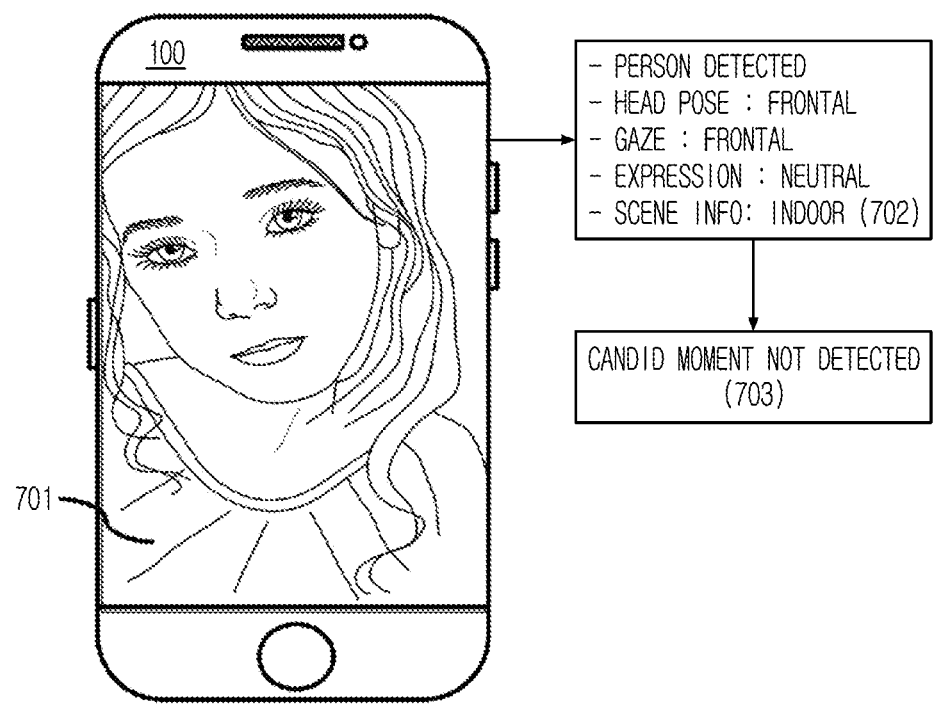
FIG. 7 is a diagram illustrating an example scenario of detecting image frames with/without the candid moment by the electronic device, according to various embodiments.
Figure 7:
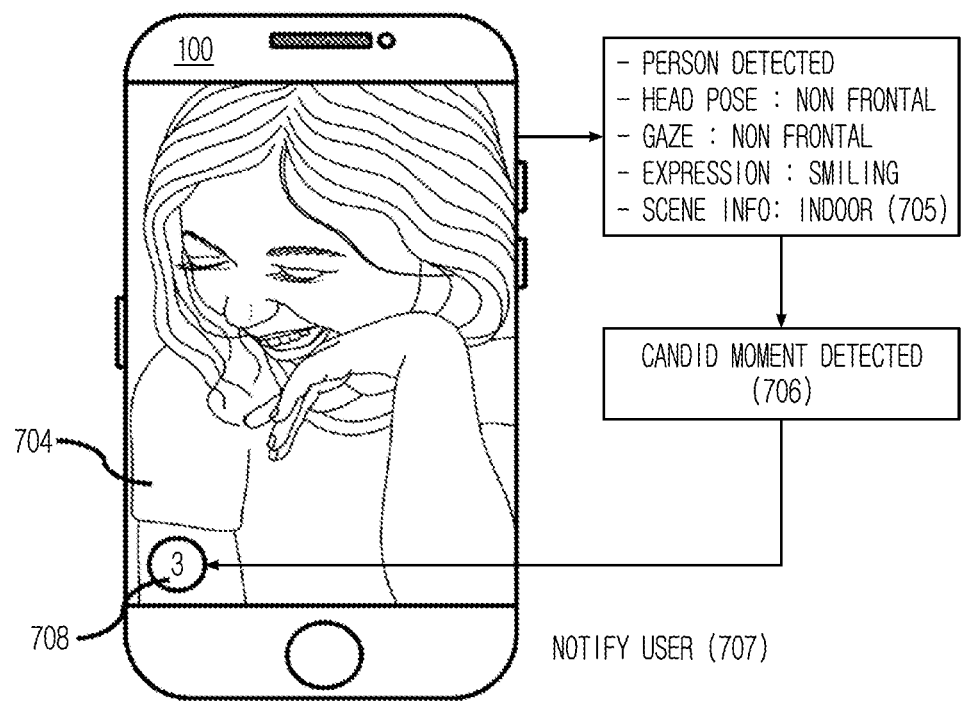

FIG. 7 is a diagram illustrating an example scenario of detecting image frames with/without the candid moment by the electronic device (100), according to various embodiments. Consider, the user is focusing the camera (160) of the electronic device (100) on a girl for capturing the candid image of the girl. Consider, the girl is looking towards the electronic device (100) without a normal expression. The electronic device (100) previews the image of the girl (701). Further, the electronic device (100) detects (702) that the head pose of the girl is frontal, the gaze of the girl is frontal, the expression of the girl is neutral, and a scene is an indoor environment from the previewed image (701). Further, the electronic device (100) detects (703) that the previewed image (701) of the girl does not include the candid moment using the ML model (116). Consider, the girl changes the head pose and started smiling later. The electronic device (100) previews the image of the girl (704).

Further, the electronic device (100) detects (705) that the head pose of the girl is non-frontal, the gaze of the girl is non-frontal, the expression of the girl is smiling, and the scene is the indoor environment from the previewed image (704). Further, the electronic device (100) detects (706) that the previewed image (704) of the girl includes the candid moment using the ML model (116) and determines the candid score of the previewed image (704) as 3 out of 4. Further, the electronic device (100) notifies (707) the user that the previewed image (704) includes the candid moment by overlaying the candid score (708) over the previewed image (704). Moreover, the user is aware of the level of candidness in the previewed image (704) based on the candid score (704).

Additionally, the electronic device (100) can provide tips to the user to make necessary changes in the pose of the girl to achieve the upper limit of the candid score (e.g. 4). Moreover, when the previewed image (701) is detected as the non-candid image, the electronic device (100) can provide tips to the user to make necessary changes in the pose of the girl for getting the previewed image with the candid moment.

Figure 8:
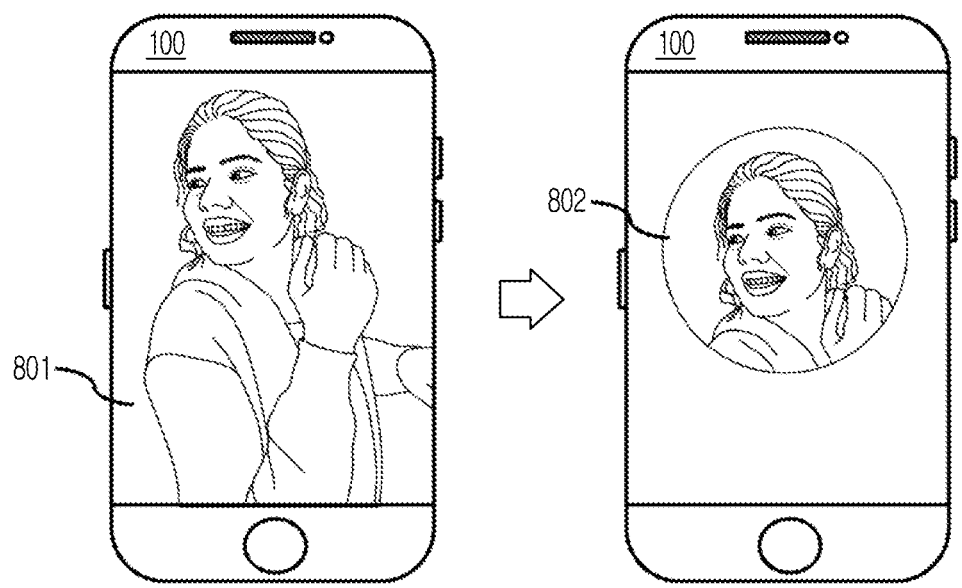
FIG. 8 is a diagram illustrating an example scenario of generating a profile picture with the candid moment of the user by the electronic device using the proposed method, according to various embodiments.

FIG. 8 is a diagram illustrating an example scenario of generating a profile picture with the candid moment of the user by the electronic device (100, according to various embodiments. Consider, the user wants to set the candid image of the user as the profile picture of a user account. In response to receiving a selection on an image (801) stored in the electronic device (100), the electronic device (100) analyses the image (801). Further, the electronic device (100) identifies a portion in the image (801) with a maximum candid score. Further, the electronic device (100) crops the portion in the image (801) with the maximum candid score and displays it as the profile picture (802).

Figure 9:
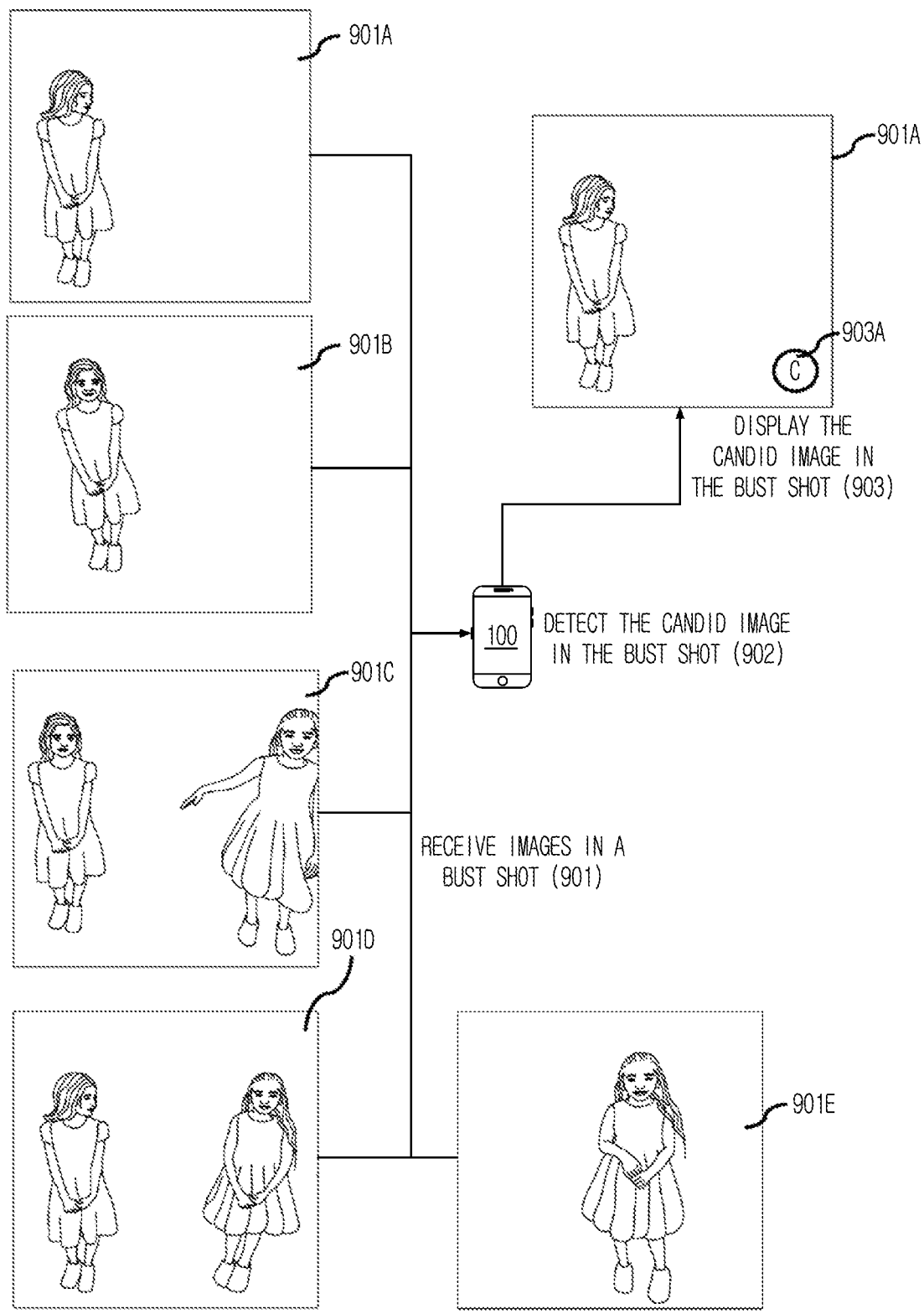
FIG. 9 is a diagram illustrating an example scenario of displaying a candid image in a burst shot by the electronic device using the proposed method, according to various embodiments.

FIG. 9 is a diagram illustrating an example scenario of displaying the candid image in a burst shot by the electronic device (100), according to various embodiments. Consider the user wants to capture the candid images of a girl(s) in a scene. The user captures the burst shot of the scene. A set of images (901A, 901B, 901C, 901D and 901E which may be referred to hereinafter as 901A-901E) are generated while capturing the burst shot of the scene as shown in the FIG. 9. In response to receiving the set of images (901A-901E) at 901, the electronic device (100) analyses each image (901A-901E) and determines the candid score of each image (901A-901E). The electronic device (100) detects that the candid score of the image (901A) is more than the threshold candid score, whereas the candid score of other images (901B-901E) is less than or equal to the threshold candid score. At 902, the electronic device (100) detects the image (901A) as the candid image due to a higher candid score than the threshold candid score. At 903, the electronic device (100) displays the image (901A) overlaid by an indicia (903A) indicating that the image (901A) is the candid image.

Figure 10:
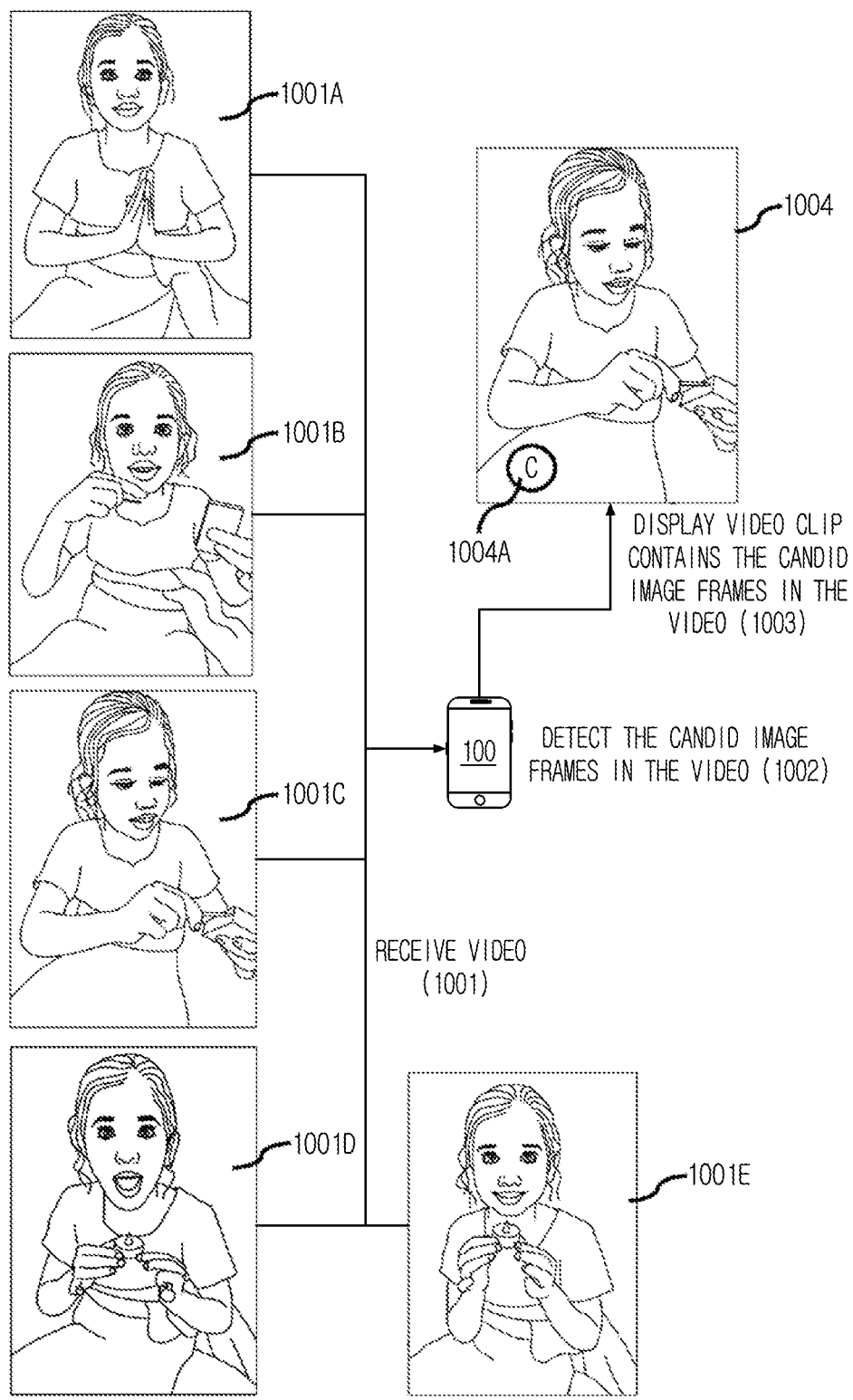
FIG. 10 is a diagram illustrating an example scenario of displaying a video clip containing candid image frames in a video by the electronic device using the proposed method, according to various embodiments.

FIG. 10 is a diagram illustrating an example scenario of displaying a video clip containing candid image frames in a video by the electronic device (100), according to various embodiments. Consider the user wants to generate the video clip containing candid image frames of a girl in a scene. The user captures the video of the scene. Image frames (1001A, 1001B, 1001C, 1001D, 1001E, which may be referred to hereinafter as 1001A-1001E) are generated while capturing the video of the scene as shown in the FIG. 10. In response to receiving the images frames (1001A-1001E) at 1001, the electronic device (100) analyses each image frame (1001A-1001E) and determines the candid score of each image frame (1001A-1001E).

The electronic device (100) detects that the candid score of the image frame (1001C) is more than the threshold candid score, whereas the candid score of other images (1001A, 1001B, 1001D, 1001E) is less than or equal to the threshold candid score. At 1002, the electronic device (100) detects the image frame (1001C) as the candid image frame due to the higher candid score than the threshold candid score. Further, the electronic device (100) generates the video clip (1004) using the image frame (1001C). At 1003, the electronic device (100) displays the video clip (1004) overlaid by an indicia (1004A) indicating that the video clip contains is the candid image frames.

Figure 11:
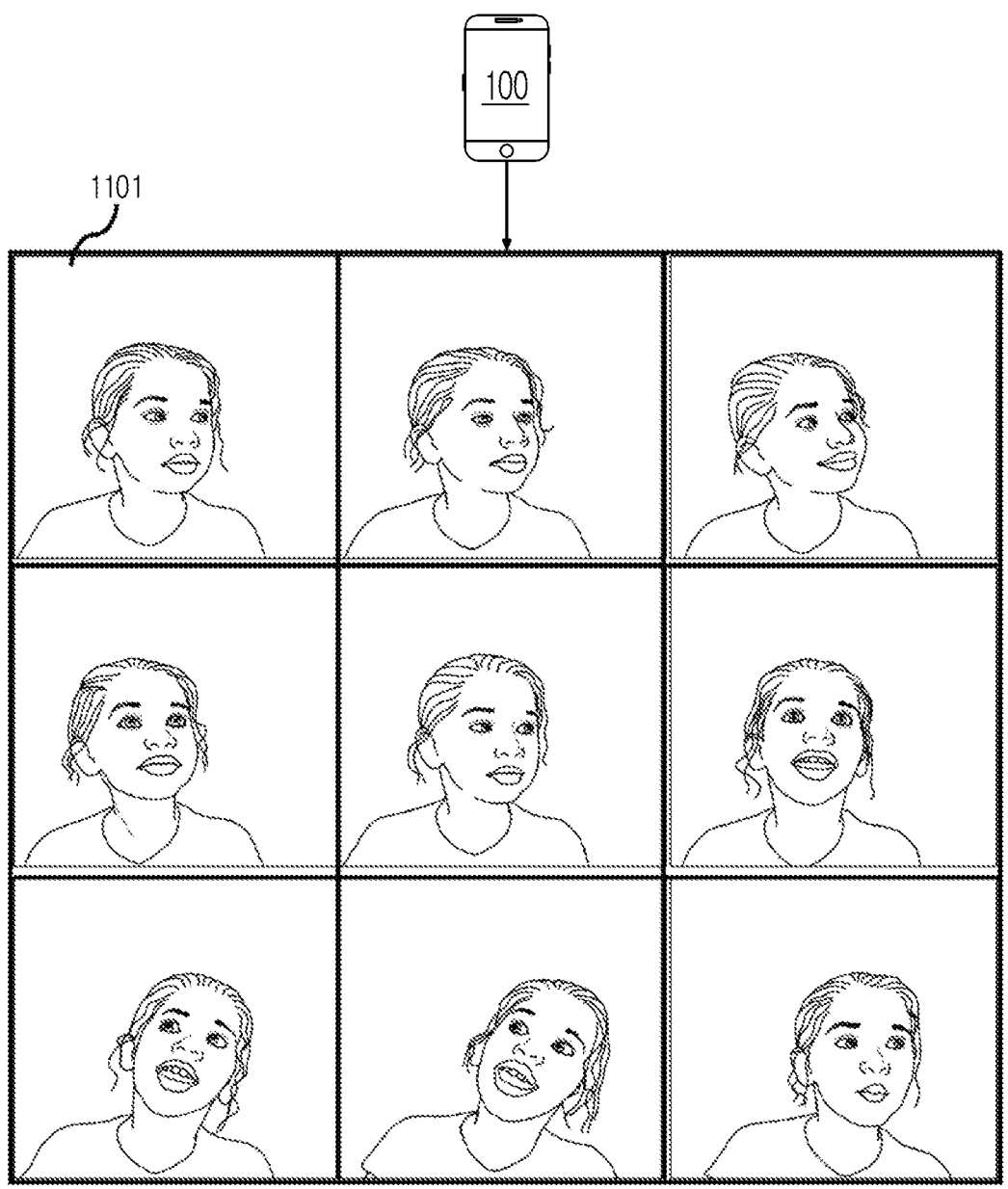
FIG. 11 is a diagram illustrating an example scenario of generating a collage of candid images by the electronic device using the proposed method, according to various embodiments.

FIG. 11 is a diagram illustrating an example scenario of generating a collage of candid images by the electronic device (100), according to various embodiments. Consider, a gallery of the electronic device (100) that includes many images of the user. The user wants to create a collage of candid images of the user. In response to receiving an input to create the collage, the electronic device (100) determines the candidate score of the images of the user in the gallery and selects the images with the candidate score more than the threshold candid score. Further, the electronic device (100) creates the collage (1101) using the selected images, where the selected images are the candid images.

The foregoing description of various example embodiments, by applying current knowledge, one skilled in the art may readily modify and/or adapt for various applications such example embodiments without departing from the scope of the disclosure, and, therefore, such adaptations and modifications should and are intended to be understood to be within the meaning and range of equivalents of the disclosed embodiments. It is to be understood that the phraseology or terminology employed herein is for the purpose of description and not of limitation. Therefore, while the various embodiments herein have been described in terms of example embodiments, those skilled in the art will recognize that the embodiments herein can be practiced with modification within the scope of the embodiments as described herein. It will also be understood that any of the embodiment(s) described herein may be used in conjunction with any other embodiment(s) described herein.

What is claimed is:

1. A method for detecting a candid moment in an image frame, the method comprising:
    receiving, by an electronic device, a plurality of image frames;
    determining, by the electronic device, a candid score of each image frame in the plurality of image frames using at least one Machine Learning (ML) model, wherein the candid score comprises a quantitative value of candidness present in the plurality of image frames;
    determining, by the electronic device, whether the candid score of the at least one image frame in the plurality of image frames meets a threshold candid score;

identifying, by the electronic device, that a candid moment is present in the at least one image frame in response to determining that the candid score of the at least one image frame meets the threshold candid score;

displaying, by the electronic device, the at least one image frame comprising the candid moment, and wherein determining, by the electronic device, the candid score of each image frame in the plurality of image frames using the at least one ML model, comprises:

identifying, by the electronic device, local features in the plurality of image frames;

determining, by the electronic device, a first score of the local features using the at least one ML model, wherein the first score is a quantitative value of the local features present in the plurality of image frames;

identifying, by the electronic device, global features in the plurality of image frames;

determining, by the electronic device, a second score of the global features using the at least one ML model, wherein the second score is a quantitative value of the global features present in the plurality of image frames; and obtaining, by the electronic device, the candid score of each image frame in the plurality of image frames by providing the first score and the second score to the at least one ML model.

2. The method as claimed in claim 1, wherein determining, by the electronic device, the candid score of each image frame in the plurality of image frames using the at least one ML model, comprises:

identifying, by the electronic device, local features comprising at least one of a head pose, a gaze, a body pose, and an expression, in the plurality of image frames; and identifying, by the electronic device, global features comprising at least one of a gesture, a body pose, a relationship between objects, an activity, or an interaction between the objects, in the plurality of image frames.

3. The method as claimed in claim 1, wherein displaying, by the electronic device, the at least one image frame comprising the candid moment, comprises:

displaying, by the electronic device, the at least one image frame comprising the candid moment with the candid score.

4. The method as claimed in claim 1, wherein the method comprises:

detecting, by the electronic device, that the candid score does not meet an upper limit of the candid score;

identifying, by the electronic device, at least one of local features and global features needed to change for increasing the candid score based on scores of the local features and the global features; and displaying, by the electronic device, a recommendation for changing at least one of the identified local features and the identified global features for increasing the candid score.

5. The method as claimed in claim 1, wherein the at least one ML model is trained for determining the candid score by:

receiving, by the at least one ML model, a classification on candid images and non-candid images;

determining, by the at least one ML model, local features and global features in the candid images and non-candid images;

receiving, by the at least one ML model, scores of the local features and the global features in each candid image; and correlating, by the at least one ML model, the scores of the local features and the global features with the local features and the global features in the candid images respectively.

6. An electronic device configured to detect a candid moment in an image frame, the electronic device comprising:

a memory;

a processor; and a candid engine, coupled to the memory and the processor, comprising processing circuitry, and configured to:

receive a plurality of image frames, determine a candid score of each image frame in the plurality of image frames using at least one Machine Learning (ML) model, wherein the candid score is a quantitative value of candidness present in the plurality of image frames, determine whether the candid score of the at least one image frame in the plurality of image frames meets a threshold candid score, identify that the candid moment is present in the at least one image frame in response to determining that the candid score of the at least one image frame meets the threshold candid score, and displaying the at least one image frame comprising the candid moment wherein determining the candid score of each image frame in the plurality of image frames using the at least one ML model, comprises:

identifying, local features in the plurality of image frames;

determining, a first score of the local features using the at least one ML model, wherein the first score is a quantitative value of the local features present in the plurality of image frames;

identifying, global features in the plurality of image frames;

determining, a second score of the global features using the at least one ML model, wherein the second score is a quantitative value of the global features present in the plurality of image frames; and obtaining, by the electronic device, the candid score of each image frame in the plurality of image frames by providing the first score and the second score to the at least one ML model.

7. The electronic device as claimed in claim 6, wherein determining the candid score of each image frame in the plurality of image frames using the at least one ML model, comprises:

identifying local features comprising at least one of a head pose, a gaze, a body pose, and an expression, in the plurality of image frames; and identifying global features comprising at least one of a gesture, a body pose, a relationship between objects, an activity, an interaction between the objects, in the plurality of image frames.

8. The electronic device as claimed in claim 6, wherein displaying the at least one image frame comprising the candid moment, comprises:

displaying the at least one image frame comprising the candid moment with the candid score.

9. The electronic device as claimed in claim 6, wherein the candid engine is configured to:

detect that the candid score does not meet an upper limit of the candid score;

identify at least one of local features and global features needed to change for increasing the candid score based on scores of the local features and the global features; and display a recommendation for changing at least one of the identified local features and the identified global features for increasing the candid score.

10. The electronic device as claimed in claim 6, wherein the at least one ML model is trained for determining the candid score by:

receiving a classification on candid images and non-candid images;

determining local features and global features in the candid images and non-candid images;

receiving scores of the local features and the global features in each candid image; and correlating the scores of the local features and the global features with the local features and the global features in the candid images, respectively.

11. A method for automatically detecting a best moment in preview image frames, comprising:

receiving, by an electronic device, the preview image frames from a camera sensor;

estimating, by the electronic device, a first score for each preview image frame using local features;

estimating, by the electronic device, a second score for each preview image frame using global features;

determining, by the electronic device, a candid score for each preview image frame using the first score and the second score; and recommending, by the electronic device, at least one preview image frame with the candid score above a threshold candid score.

* * * * *